No. 732,207. PATENTED JUNE 30, 1903.
H. C. MICHELL.
BOILER COVERING AND METHOD OF MAKING SAME.
APPLICATION FILED OCT. 8, 1901.
NO MODEL.
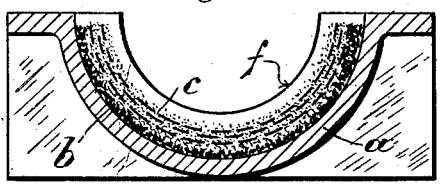
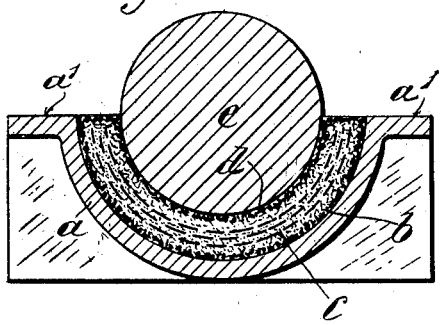
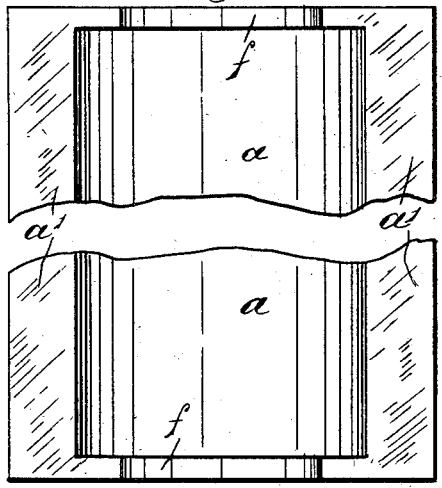
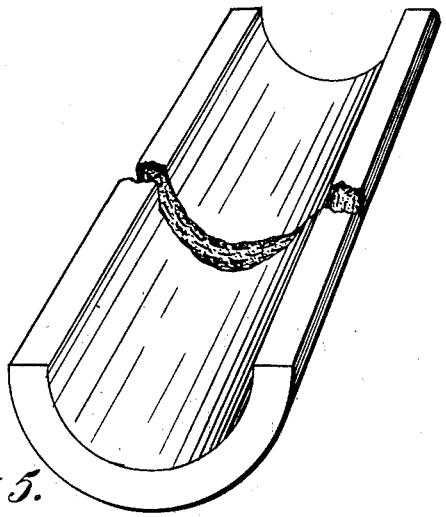
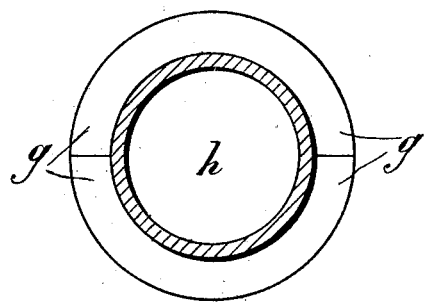
Witnesses.
C. W. Clement
E. M. Olmsted
Inventor
H. C. Michell
By Winton & Watson
his Attorneys No. 732,207.

Patented June 30, 1903.

UNITED STATES PATENT OFFICE.

HENRY COLBECK MICHELL, OF LONDON, ENGLAND.

BOILER-COVERING AND METHOD OF MAKING SAME.

SPECIFICATION forming part of Letters Patent No. 732,207, dated June 30, 1903.

Application filed October 8, 1901. Serial No. 77,988. (No model.)

*To all whom it may concern:*

Be it known that I, HENRY COLBECK MICHELL, a subject of the King of Great Britain, residing at London, England, have invented certain new and useful Improvements in Boiler-Coverings and Method of Making the Same, of which the following is a specification.

This invention has reference to the manufacture in a cheap and advantageous manner of non-conducting coverings, blocks, and slabs which are efficient non-conductors of heat, are comparatively light in weight, and therefore easily handled and applied, which will keep in a dry and therefore efficient condition for a long time, and which are specially suitable for covering steam pipes, boilers, and the like to protect them from loss of heat by radiation and may also be advantageously used for other purposes where it is desired to prevent or retard the passage or flow of heat.

The invention consists in the novel features of construction herein described, and specifically pointed out in the claims.

In the preparation of non-conducting coverings, blocks, and slabs according to the present invention flake-mica is used with a light porous or open filling material—such, for example, as wood fiber of the kind known commercially as "excelsior," "slag-wool," "asbestos," or like fibrous material or "granulated" or "flaked" cork or the like—and the mixture is inclosed in a crust or shell of the desired shape and size composed of mica in the form of small flakes or particles and a binding agent, such as silicate of soda, mixed with a substance that will counteract the hygroscopic nature of silicate of soda and admit of the resulting non-conducting material being maintained in a dry and efficient condition for a long time. A suitable substance for this purpose is acetate of lead—*i. e,* sugar of lead, preferably with the addition of lime.

In carrying out my invention the flake-mica used may advantageously be such as is obtained in carrying out the mica-flaking process forming the subject of another application by me for Letters Patent of even date herewith, Serial No. 77,987. Both or either the larger flakes and the smaller (otherwise waste) flakes resulting from such process can be used.

The manufacture of non-conducting coverings of the kind referred to suitable for covering steam-pipes and the like is or may be carried out in the manner I will now describe with reference to the accompanying illustrative drawings, wherein—

Figure 1 is a cross-section, and Fig. 2 a plan, of a semicircular mold partly charged with non-conducting material, the said figures showing the first stage in the manufacture of a non-conducting covering according to this invention. Fig. 3 is a similar view to Fig. 1, showing a further stage in the manufacture. Fig. 4 is a perspective view showing a finished non-conducting covering of hollow semicylindrical shape. Fig. 5 shows two such conducting-coverings arranged to surround a pipe shown in section.

A mold $a$, Fig. 1, of semicylindrical shape internally and of a diameter and length corresponding to the diameter and length of the semicylindrical length, Fig. 4, of non-conducting material to be produced is covered internally with a thin layer $b$, conveniently of about five-sixteenths of an inch (more or less) in thickness, of a mixture of mica flakes or particles with a solution of silicate of soda containing acetate of lead or acetate of lead and lime, the mixture having a consistency corresponding to about that of ordinary mortar. The proportions may be varied according to requirement. As an example the solution of silicate of soda may be of the strength ordinarily sold in commerce, and the quantity of acetate of lead and caustic lime dissolved therein may conveniently be in the proportion of about two or three parts, by weight, of acetate of lead and one part, by weight, of lime to one hundred parts, by weight, of silicate of soda in solution. The layer of mixture thus applied is then completely and lightly covered with a mass of material $c$, composed of mica flakes, and a light porous or open filling material, such as wood fiber, asbestos, or other like fibrous material, or flaked or granulated cork. The mica flakes and filling material are or may be arranged as nearly as possible in alternate layers of suitable thickness, the mica flakes being arranged so that their flat surfaces are as nearly as practicable concentric to the inner surface of the mold $a$, and therefore approximately at right angles to the direction in which heat would pass through the covering. The relative quantities of mica flakes and filling material can be varied to suit requirement and according (*inter alia*) as lightness or strength is the chief desideratum. Also the thickness of the coverings can be varied to suit requirements. A covering suitable for steam-pipes, adapted to give good results in practice and having, for example, a total thickness of about 1¼ (one and one-fourth) inches, may have a crust or shell of about $\frac{5}{16}$ (five-sixteenths) of an inch thick, inclosing an inner mass made of about $\frac{5}{8}$ (five-eighths) of an inch thick and composed of about equal quantities, by volume, of the filling material and flake-mica. If a lighter covering is required, the proportions of filling material can be increased. In each case the filling material should be arranged to separate the mica flakes from each other as much as possible. Upon the mixture of filling material and mica is then spread a thin layer $d$, Fig. 3—say of about five sixteenths of an inch in thickness—composed of mica flakes or particles. Centrally upon the material is then placed a cylindrical metal core $e$, the diameter of which corresponds to the internal diameter of the required semicylindrical-shaped piece of non-conducting covering material. The core is supported in position by suitable brackets or bearings $f$ at the ends of the mold and has a rapid rotary movement imparted to it alternately in opposite directions, whereby the inner mass $c$ of filling material and mica and the upper layer $d$ of mica are caused to quickly assume the required semicircular shape in cross-section, with the mica flakes as nearly as possible at right angles to the radii of the mass. Over and along the top of the cylindrical core $e$ is then poured or distributed a small quantity of a solution of silicate of soda containing acetate of lead and lime, such as used for the outer layer $a$ of material, such solution being allowed to trickle around the surface of the core $e$ and permeate the top or inner layer $d$ of mica and extend more or less into the central mass $c$ of filling material and mica. Some of the said solution is also distributed over the upper exposed surfaces of the mass between the outer longitudinal edges $a'$ of the mold $a$ and the core $e$, these longitudinal surfaces being made quite flat and true, so that they will fit closely against the corresponding abutting edges or surfaces of a corresponding semicylindrical-shaped piece of non-conducting material, when the two pieces are placed and secured together to form a complete cylindrical covering $g$ around a pipe $h$, as shown in Fig. 5. The non-conducting material molded to shape as described is then dried, for which purpose the mold $a$, with the material therein and the core $e$ thereon, may conveniently be placed in a suitable oven and dried by the application of heat. The material in the mold can, however, if desired, be dried by mere exposure to the atmosphere; but this mode of drying will of course not be so expeditious as when an oven is used. When dry, the non-conducting covering, Fig. 4, thus produced is ready for use and may be covered with canvas or the like.

Instead of placing the thin layer $d$ of mica upon the top of the mass to form the inner crust or shell of the covering I may omit this layer and form the inner crust by simply supplying a sufficient quantity of the filling material mixed with mica to take its place and applying the binding material in the manner heretofore described. In such case if the filling material is such as would char or burn out in the drying process or in use the binding material and the mica particles which remain at the surface would still form a substantial inner crust. A similar method is adopted for the manufacture of non-conducting coverings of other forms, as also blocks or slabs, the mold being made in each case of the shape of the desired portions of coverings, blocks, or slabs, and the core $e$ being dispensed with when necessary. In such cases also the mica is arranged so that it will be at right angles to the direction in which the heat radiates when the block is in use and the flakes are separated by the filling material.

By the manufacture of non-conducting coverings, blocks, or slabs in the manner hereinbefore described there is obtained a product the inner portion of which is of a very light porous and interstitial nature, so that such coverings, blocks, or slabs will be light to handle and apply and will offer great resistance to the passage of heat therethrough and will therefore be very efficient as non-conductors of heat, while the outer portion or shell will be of a close and durable nature and in consequence of the presence of the non-hygroscopic material therein will prevent the outer surface of the said coverings, blocks, or slabs absorbing moisture from the air and becoming damp and deteriorating and inefficient in use.

Non-hygroscopic crusts or shells such as hereinbefore described may advantageously be used in the production of non-conducting coverings, blocks, or slabs the interior of which is charged with non-conducting material of various kinds.

In some cases instead of forming the non-conducting coverings, blocks, and slabs of separate layers of material arranged as described they may be formed of an intimate mixture composed of flake or divided mica, filling material, a binding agent, and a substance such as described adapted to render the mass non-hygroscopic, the mixture, of the consistency, say, of mortar, being molded to shape and dried. In such case if the filling material be combustible it will char in the drying process and leave the covering in the form of a mass having interstices between the mica flakes. Preferably, however, the covering is formed, as previously described, with the mica in the interior of the mass arranged in more or less determinate layers at right angles to the direction in which the heat is radiated, the pieces of mica in adjacent layers being kept apart by the filling material to avoid conduction of the heat from layer to layer as far as possible.

The drying is in all cases preferably effected in an oven heated, say, to about 400° to 500° Fahrenheit.

Non-conducting coverings instead of being made in semicylindrical-shaped pieces, as described, may in some cases and to suit different circumstances be made in segments of a less angular width than one hundred and eighty degrees, the mold being altered to suit, or they may be made tubular in form, if desired.

Having described my invention, what I claim, and desire to secure by Letters Patent, is—

1. A non-conducting covering, block or slab comprising an outer crust or shell, and an inner interstitial portion of mica and a filling material.

2. A non-conducting covering, block or slab comprising, an outer crust or shell, and an inner interstitial portion of mica flakes or sheets and a filling material arranged in alternate layers.

3. A non-conducting covering, block or slab, the outer portion of which is composed of a non-hygroscopic crust or shell.

4. A non-conducting covering, block or slab, the outer portion of which is composed of a micaceous material, a binding agent, and an antihygroscopic substance.

5. A non-conducting covering, block or slab the outer portion of which is composed of a non-hygroscopic crust or shell, and the inner portion of which is composed of an interstitial mass of divided mica and a filling material.

6. A non-conducting covering, block or slab comprising an outer crust or shell composed of micaceous material, a non-hygroscopic binding material, and an inner interstitial portion composed of mica flakes or sheets and a filling material arranged in alternate layers.

7. A non-conducting covering, block or slab, the inner portion of which is composed of an interstitial mass of divided mica and a filling material.

8. A non-conducting body comprising an outer crust or shell composed of a mixture of divided mica, silicate of soda, and a body capable of counteracting the hygroscopic nature of said silicate of soda, and an inner interstitial mass of non-conducting material.

9. A non-conducting body comprising an outer crust or shell composed of a mixture of divided mica, silicate of soda, and an inner mass composed of mica flakes and filling material, as set forth.

10. A non-conducting body comprising an outer crust or shell composed of a mixture of divided mica, silicate of soda, and acetate of lead, and an inner interstitial mass of non-conducting material.

11. A non-conducting body comprising an outer crust or shell composed of a mixture of divided mica, silicate of soda, acetate of lead, and lime and an inner interstitial mass of non-conducting material.

12. A non-conducting body comprising an outer crust or shell composed of a mixture of divided mica, silicate of soda, and acetate of lead, and an inner mass composed of mica flakes and a filling material, as set forth.

13. A non-conducting body comprising an outer crust or shell composed of a mixture of divided mica, silicate of soda, acetate of lead and lime, and an inner mass composed of mica flakes and a filling material, as set forth.

14. The herein-described method of producing non-conducting pipe or boiler coverings, said method consisting in spreading a layer of a mixture of divided mica and a binding agent over the interior of a mold, arranging on said layer a layer composed of flake-mica and a filling material, arranging on this second layer, an inner layer of flake-mica, imparting a rolling motion to a body laying on said third layer, and pouring a liquid binding agent over said body and inner layer, substantially as described.

In testimony whereof I affix my signature in presence of two witnesses.

HENRY COLBECK MICHELL.

Witnesses:
ROBERT WATSON,
C. A. NEALE.